United States Patent
Bui

(10) Patent No.: US 7,577,187 B2
(45) Date of Patent: Aug. 18, 2009

(54) METHOD OF NOISE FACTOR COMPUTATION FOR CHIP EQUALIZER IN SPREAD SPECTRUM RECEIVER

(75) Inventor: Thanh Ngoc Bui, Victoria (AU)

(73) Assignee: NEC Corporation, Tokyo (JP)

( * ) Notice: Subject to any disclaimer, the term of this patent is extended or adjusted under 35 U.S.C. 154(b) by 584 days.

(21) Appl. No.: 11/183,967

(22) Filed: Jul. 19, 2005

(65) Prior Publication Data
US 2006/0018367 A1   Jan. 26, 2006

(30) Foreign Application Priority Data
Jul. 20, 2004  (AU)  ............... 2004904006
Jul. 6, 2005   (AU)  ............... 2005203016

(51) Int. Cl.
*H04B 1/69*   (2006.01)
(52) U.S. Cl. .................. 375/148; 375/340; 375/150; 375/267; 714/794
(58) Field of Classification Search ................ 375/148, 375/340, 150, 267, 341, 147, 232; 714/794
See application file for complete search history.

(56) References Cited

U.S. PATENT DOCUMENTS 7,324,583 B2 * 1/2008 Hooli et al. ............... 375/148

2005/0276356 A1 * 12/2005 Hui ............................ 375/340

OTHER PUBLICATIONS

Bernardini et al., "One-Shot Digital Equalization for Nonlinear Modulations," Conference Proceedings Article, Mar. 19, 1992, pp. 252-263.
Mailaender, Laurence, "Linear MIMO Chip Equalization for the CDMA Downlink," Signal Processing Advances in Wireless Communications, Jun. 15, 2003, 4th IEEE Workshop on Signal Processing, pp. 299-303.
Qureshi, Shahid U.H., "Adaptive Equalization," Proceedings of the IEEE, Sep. 1985, vol. 73, No. 9, pp. 1349-1387.
Zhang et al., "Efficient Linear Equalization for High Data Rate Downlink CDMA Signaling," Institute of Electrical and Electronics Engineers, Conference Record of the 37th Asilomar Conference on Signals, Systems & Computers, Nov. 9, 2003, vol. 1 of 2, pp. 141-145.

* cited by examiner

*Primary Examiner*—Chieh M. Fan
*Assistant Examiner*—Eva Puente
(74) *Attorney, Agent, or Firm*—Foley & Lardner LLP

(57) ABSTRACT

A method of noise factor computation for a chip equalizer in a spread spectrum receiver, the method including the steps of: computing channel and noise variance estimates for multiple resolvable fading paths of chip signals received at the spread spectrum receiver; computing the sum of power of the channel estimates; estimating the chip energy of the chip signals; and computing the noise factor from the chip energy estimate, channel and noise variance estimates, sum of power of the channel estimates, and spreading factor of the pilot signal.

8 Claims, 1 Drawing Sheet

METHOD OF NOISE FACTOR COMPUTATION FOR CHIP EQUALIZER IN SPREAD SPECTRUM RECEIVER

BACKGROUND OF THE INVENTION

1. Field of the Invention

The present invention relates generally to spread spectrum receivers, and in particular to methods of optimizing the equalization of a spread spectrum signal transmitted through multiple resolvable fading paths channel. The present invention is suitable for use in applications involving W-CDMA transmission techniques, and it will be convenient to describe the invention in relation to that exemplary application.

2. Description of the Related Art

In W-CDMA communication systems, multi code signals at the transmitter are orthogonal to each other. However, this orthogonality is lost as the signals propagate through a multipath fading channel. A chip equalizer is employed in the W-CDMA receiver as a means to restore the orthogonality of the signal, and thereby improve the receiver performance.

Typically, chip equalizers are implemented as a Finite Impulse Response (FIR) filter. The chip equalizer tries to compensate for the multipath interference by inverting the channel. A known method for computing optimal chip equalizer filter coefficients using a direct inversion matrix method involves estimation of the matrix G from the expression $G = H^H H + \beta I$, where $H^H H$ is the channel correlation matrix, I is identity matrix, and $\beta$ is the scalar noise factor in a W-CDMA system.

The method for channel estimation to obtain the channel correlation matrix is usually straight forward, and can be estimated based on the common pilot signal in W-CDMA systems. However, to date there has been limited or no consideration of a optimal method of computing an estimate of the scalar noise factor in the W-CDMA system. A chip equalizer that only uses knowledge of channel estimation and does not take into account noise variance results in sub optimal performance compared to a receiver that takes both factors into account.

SUMMARY OF THE INVENTION

In view of the above, it is an object of the present invention to provide a method of equalizing the received chip signal distorted by multiple paths that ameliorates or overcomes one or more disadvantages of the prior art.

It is another object of the present invention to provide a method of noise factor computation for a chip equalizer in a spread spectrum receiver that optimized the equalization of the received chip signal.

It is still another object of the present invention to provide a method of noise factor computation for a chip equalizer in a spread spectrum receiver that was simple and practical to implement.

According to a first aspect of the present invention, there is provided a method of computing a noise factor for use in a chip equalizer making up a spread spectrum receiver, the method including the steps of:

computing channel and noise variance estimates for multiple resolvable fading paths of chip signals received at the spread spectrum receiver;

computing a sum of power of the channel estimates;

estimating chip energy of the chip signals; and computing the noise factor from the chip energy estimate, the channel and noise variance estimates, the sum of power of the channel estimates, and spreading factor of a pilot signal.

In the foregoing first aspect, the step of computing channel and noise variance estimates may be carried out by using a despread pilot signal corresponding to each fading path.

Also, the step of computing the sum $\hat{P}$ of power of the channel estimates may be carried out in accordance with the expression (1):

$$\hat{P} = \sum_{l=1}^{L} |\hat{h}_l|^2 \tag{1}$$

where $\hat{h}_l$ is the channel estimate of l-th fading path.

Furthermore, the step of computing the noise factor is preferably carried out by selecting the channel and noise variance estimates from the fading path having the greatest power.

Still furthermore, the step of selecting the channel $\hat{h}_m$ and noise variance $\sigma_m^2$ estimates from the fading path having the greatest power may be carried out in accordance with the expression (2):

$$m = \arg\left[\max\left\{|\hat{h}_l|^2\right\}\right] \tag{2}$$

where m is the index of the fading path having the greatest power and $\hat{h}_l$ is the channel estimate of l-th fading path.

In addition, the step of computing the noise factor $\beta$ may be carried out in accordance with the expression (3):

$$\beta = \frac{\hat{E}_c |\hat{h}_m|^2}{\hat{E}_c - SF\sigma_m^2} - \hat{P} \tag{3}$$

where $\hat{E}_c$ is the estimated chip energy of the chip signals, $\hat{h}_m$ is the channel estimate of the fading path having the strongest power, $\sigma_m^2$ is the noise variance estimate of the fading path having the strongest power, SF is the spreading factor of the pilot signal received at the spread spectrum receiver and $\hat{P}$ is sum of power of the channel estimates.

According to a second aspect of the present invention, there is provided a method of determining filer coefficients for used in a chip equalizer FIR (Finite Impulse Response) filter making up a spread spectrum receiver, the method including:

computing channel and noise variance estimates for multiple resolvable fading paths of chip signals received at the spread spectrum receiver;

computing a sum of power of the channel estimates;

estimating chip energy of the chip signals;

computing a scalar noise factor from the chip energy estimate, the channel and noise variance estimates, the sum of power of the channel estimates, and spreading factor of a pilot signal;

constructing a matrix G according to expression (4):

$$G = H^H H + \beta I \tag{4}$$

where $H^H H$ is a channel correlation matrix, I is identity matrix, and $\beta$ is the scalar noise factor; and calculating the filter coefficients based on the matrix G.

According to a third aspect of the present invention, there is provided a chip equalizer for use in a spread spectrum receiver, including one or more computational blocks for implementing at least one of the above-described methods.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Figure 1:
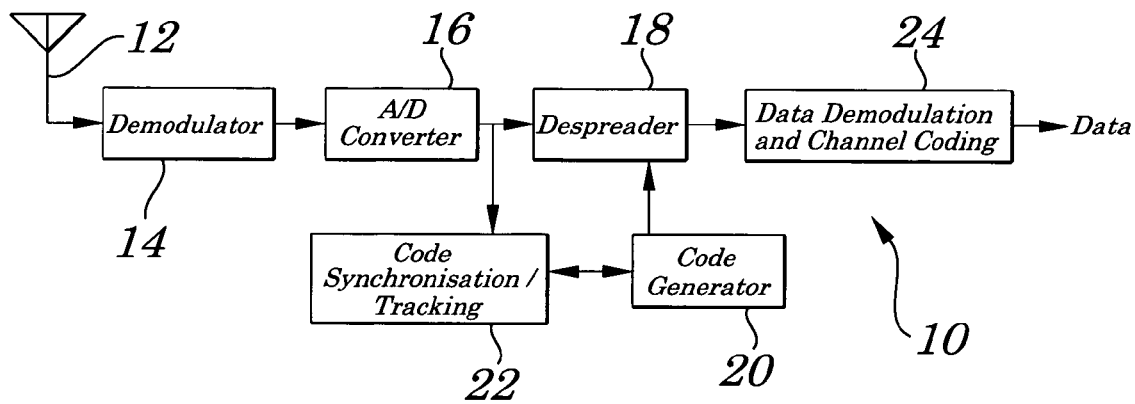
FIG. 1 is a schematic diagram of a spread spectrum receiver according to a preferable embodiment of the present invention.

The following description refers in more detail to the various features of the invention. In order to facilitate an understanding of the invention, reference is made in the description to the accompanying drawings where the method of noise factor computation for a chip equalizer in a spread spectrum receiver is illustrated in a preferred embodiment. It is to be understood however that the invention is not limited to the preferred embodiment illustrated in the drawings.

Referring now to FIG. 1, there is shown generally a spread spectrum receiver 10 including an antenna 12 for receiving spread spectrum signals, a demodulator 14 for demodulating the spread spectrum signals received at the antenna 12, and an analogue to digital converter 16 for digitizing the demodulated signals. The spread spectrum receiver 10 uses coherent demodulation to despread the demodulated signal using a locally generated code sequence from a code generator 20 in conjunction with a despreader 18. To be able to perform the despreading operation, the spread spectrum receiver 10 must not only know the channelization code sequence used to spread the signal, but the codes of the received signal and the locally generated code must be synchronized. The code synchronization/tracking block 22 performs this operation. After despreading, data symbols are demodulated and channel decoded in a data modulation and channel coding block 24 to obtain information data.

The despreader block 18 in a conventional rake receiver consists of a number of de-spread block, each for receiving a different multipath signal. In each finger, the received signal is correlated by a spreading code, which is time aligned with the delay of the multipath signal. For each multipath, the despreaded signal is then multiplied (weighted) with conjugative of channel estimate and coherently summed by RAKE combine to form the output signal.

Figure 2:
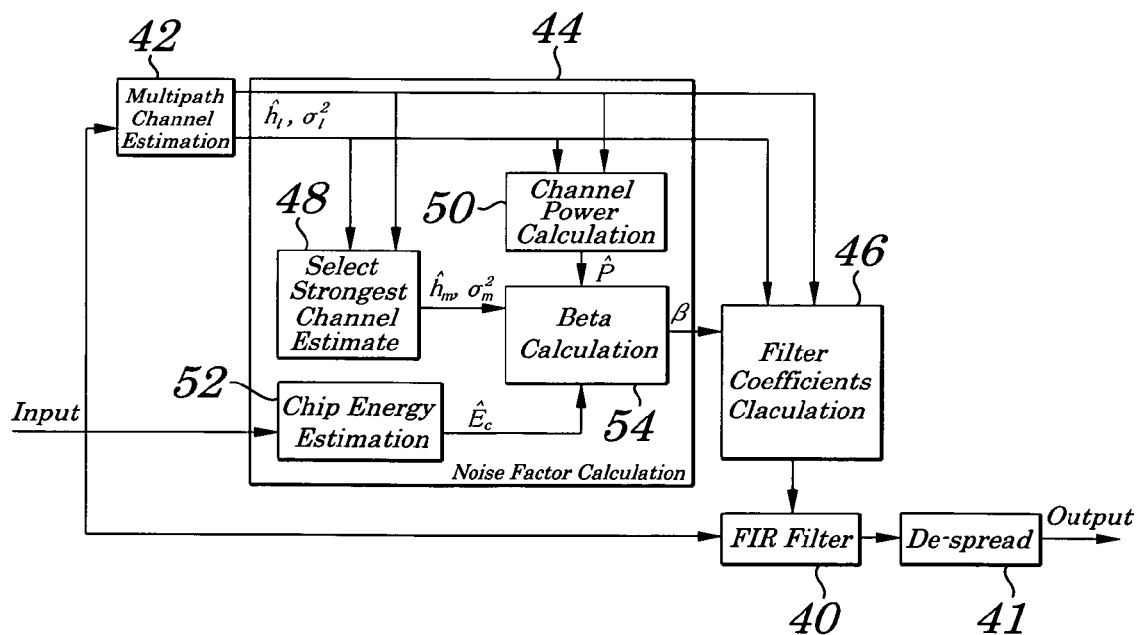
FIG. 2 is a schematic diagram of a chip equalizer forming part of a despreader block making up the spread spectrum receiver shown in FIG. 1.

FIG. 2 shows despreader block 18 where the chip equalization function is performed and various computational blocks of the despreader block 18. The main function of the chip equalizer is to estimate coefficient for used by FIR filter 40 to filter the input signal and restore the orthogonality of the multicode signals. The output data of one code signal is then performed by de-spread block 41. In case of multicode signal reception, the output of FIR filter 40 is fed to multiple de-spread blocks 41 to form output data of multicode accordingly. To estimate the FIR filter coefficients, a multipath channel estimation block 42, a noise factor calculation block 44 and a coefficients calculation block 46 are needed.

The multipath channel estimation block 42 acts to compute channel and noise variance estimates for multiple resolvable fading paths of chip signals received at the spread spectrum receiver. The block 42 derives a channel estimate $\hat{h}_l$ of l-th fading path by averaging a number of despreaded pilot symbols of that path according to expression (5):

$$\hat{h}_l = \frac{1}{K} \times \sum_K p(k)^* \times y_l(k) \quad (5)$$

where p(k)* is conjugative of pilot symbol and |p(k)|=1, K is number of pilot symbols used for estimation, $y_l(k)$ is despreaded pilot symbol of l-th path.

The unbiased estimate of noise variance $\hat{\sigma}_l^2$ at the output of l-th despreader is computed by the multipath estimation block 42 according to expression (6):

$$\hat{\sigma}_l^2 \approx \frac{K}{K-1}\left(\frac{1}{K}\sum_K |y_l(k)|^2 - |\hat{h}_l|^2\right) \quad (6)$$

The noise factor calculation block 44 includes a strongest channel estimator block 48, a channel power calculation block 50, a chip energy estimation block 52 and a scalar noise factor calculation block 54. To estimate the scalar noise factor β based on statistics of l-th path, the following considerations have been taken into account in the design of the chip equalizers. Firstly, the average received chip energy $E_{chip}$ can be obtained from expression (7):

$$E_{chip} = E[|r(m)|^2] \approx \frac{1}{M}\sum_M |r(m)|^2 \quad (7)$$

where M is number of chips used in estimation and r(m) is a chip.

Secondly, the sum $\hat{P}$ of power of channel estimates and the index m of the fading path with strongest channel estimate power can be calculated from expressions (8) and (9):

$$\hat{P} = \sum_{l=1}^{L} |\hat{h}_l|^2 \quad (8)$$

$$m = \arg\left[\max\left\{|\hat{h}_l|^2\right\}\right] \quad (9)$$

where $\hat{h}_l$ is the channel estimate of l-th fading path.

Finally, the noise factor estimate $\hat{\beta}$ can be estimated by using expression (10):

$$\hat{\beta} = \frac{\hat{E}_{chip}|\hat{h}_m|^2}{\hat{E}_{chip} - SF\hat{\sigma}_m^2} - \hat{P} \quad (10)$$

where SF is the of the spreading factor of the pilot signal received at the spread spectrum receiver.

Accordingly, the multipath channel estimation block 42 of the chip equalizer computes a channel estimate $\hat{h}_l$ and a noise variance estimate $\hat{\sigma}_l^2$ according to above-referenced expressions 1 and 2. The channel estimates and noise variance estimates for each of the multiple resolvable fading paths of chip signals are provided to the channel power calculation block 50, where the sum $\hat{P}$ of power of the channel estimates is readily obtained from the channel estimates $\hat{h}_l$. The sum of power of channel estimates is then provided to the beta calculation block 54. The chip energy estimation block 52 derives the estimated chip energy $\hat{E}_{chip}$ from the input I/Q chip samples in accordance with expression 3.

It is preferable that the noise factor is computed by selecting the channel and noise variance estimates from the fading path having the greatest power. In this regard, the strongest channel estimate block 48 acts to derive the channel and noise variance estimates $\hat{h}_m$ and $\hat{\sigma}_m^2$ from the fading path having the greatest power.

The channel $\hat{h}_m$ and noise variance $\sigma_m^2$ estimates are then provided to the scalar noise factor calculation block 54, which then uses the chip energy estimate, channel and noise variance estimate of the strongest fading path, the sum of the power of the channel estimates and the spreading factor of the pilot signal to derive an estimate of the noise factor for use in calculating the filter coefficients.

In the filter coefficients calculation block 46, the gain matrix $G = H^H H + \beta I$ is constructed in order to calculate the filter coefficients of the FIR filter 40, where $H^H H$ is the channel correlation matrix, I is identity matrix, and $\beta$ is the scalar noise factor in a W-CDMA system.

The various computational blocks of the chip equalizer shown in FIG. 2, as well as other elements of the spread spectrum receiver shown in FIG. 1, may be realized using digital signal processing techniques.

It is apparent that the present invention is not limited to the method of noise factor computation for a chip equalizer according to the above embodiment but may be changed and modified without departing from the scope and spirit of the invention.

What is claimed is:

1. An apparatus for computing a noise factor for a chip equalizer in a spread spectrum receiver, the apparatus comprising:

first computing means for computing channel and noise variance estimates for multiple resolvable fading paths of chip signals received at said spread spectrum receiver;

second computing means for computing a sum of power of the channel estimates;

estimating means for estimating chip energy of the chip signals; and third computing means for computing the noise factor from the chip energy estimate, the channel and noise variance estimates, the sum of power of the channel estimates, and spreading factor of a pilot signal, wherein the third computing means computes the noise factor by selecting the channel and noise variance estimates from the fading path having greatest power.

2. The apparatus according to claim 1, wherein the third computing means selects the channel $\hat{h}_m$ and noise variance $\sigma_m^2$ estimates from the fading path having the greatest power is carried out in accordance with following expression (2):

$$m = \arg\left[\max\left\{|\hat{h}_l|^2\right\}\right]$$

where m is an index of the fading path having the greatest power and $\hat{h}_l$ is the channel estimate of l-th fading path.

3. The apparatus according to claim 2, wherein the third computing means computes the noise factor $\beta$ in accordance with following expression:

$$\beta = \frac{\hat{E}_c |\hat{h}_m|^2}{\hat{E}_c - SF\sigma_m^2} - \hat{P} \quad (3)$$

where $\hat{E}_c$ is the estimated chip energy of the chip signals, $\hat{h}_m$ is the channel estimate of the fading path having the strongest power, $\sigma_m^2$ is the noise variance estimate of the fading path having the strongest power, SF is the spreading factor of the pilot signal received at said spread spectrum receiver and $\hat{P}$ is sum of power of the channel estimates.

4. An apparatus for determining filter coefficients for use in a chip equalizer (FIR) Finite Impulse Response filter making up a spread spectrum receiver, the apparatus comprising:

first computing means for computing channel and noise variance estimates for multiple resolvable fading paths of chip signals received at said spread spectrum receiver;

second computing means for computing a sum of power of the channel estimates;

estimating means for estimating chip energy of the chip signals;

third computing means for computing a scalar noise factor from the chip energy estimates, the channel and noise variance estimates, the sum of power of the channel estimates, and spreading factor of a pilot signal;

constructing means for constructing a matrix G according to expression;

$G = H^H H + \beta I$ where $H^H H$ is a channel correlation matrix, I is identity matrix, and $\beta$ is the scalar noise factor; and calculating means for calculating the filter coefficients based on the matrix G.

5. An apparatus for computing a noise factor for a chip equalizer in a spread spectrum receiver, the apparatus comprising:

a first computing unit configured to compute channel and noise variance estimates for multiple resolvable fading paths of chip signals received at said spread spectrum receiver;

a second computing unit configured to compute a sum of power of the channel estimates;

an estimating unit configured to estimate chip energy of the chip signals; and a third computing unit configured to compute the noise factor from the chip energy estimate, the channel and noise variance estimates, the sum of power of the channel estimates, and spreading factor of a pilot signal, wherein the third computing unit computes the noise factor by selecting the channel and noise variance estimates from the fading path having greatest power.

6. The apparatus according to claim 5, wherein the third computing unit selects the channel $\hat{h}_m$ and noise variance $\sigma_m^2$ estimates from the fading path having the greatest power is carried out in accordance with following expression:

$$m = \arg\left[\max\left\{|\hat{h}_l|^2\right\}\right]$$

where m is an index of the fading path having the greatest power and $\hat{h}_l$ is the channel estimate of l-th fading path.

7. The apparatus according to claim 6, wherein the third computing unit computes the noise factor β in accordance with following expression:

$$\beta = \frac{\hat{E}_c |\hat{h}_m|^2}{\hat{E}_c - SF\sigma_m^2} - \hat{P}$$

where $\hat{E}_c$ is the estimated chip energy of the chip signals, $\hat{h}_m$ is the channel estimate of the fading path having the strongest power, $\sigma_m^2$ is the noise variance estimate of the fading path having the strongest power, SF is the spreading factor of the pilot signal received at said spread spectrum receiver and $\hat{P}$ is sum of power of the channel estimates.

8. An apparatus for determining filter coefficients for use in a chip equalizer (FIR) Finite Impulse Response filter making up a spread spectrum receiver, the apparatus comprising:

a first computing unit configured to compute channel and noise variance estimates for multiple resolvable fading paths of chip signals received at said spread spectrum receiver;

a second computing unit configured to compute a sum of power of the channel estimates;

an estimating unit configured to estimate chip energy of the chip signals;

a third computing unit configured to compute a scalar noise factor from the chip energy estimates, the channel and noise variance estimates, the sum of power of the channel estimates, and spreading factor of a pilot signal;

a constructing unit configured to construct a matrix G according to expression;

$G = H^H H + \beta I$ where $H^H H$ is a channel correlation matrix, I is identity matrix, and β is the scalar noise factor; and a calculating unit configured to calculate the filter coefficients based on the matrix G.

* * * * *